United States Patent [19]

Larrabee

[11] 3,801,949

[45] Apr. 2, 1974

[54] THERMAL DETECTOR AND METHOD OF MAKING THE SAME

[75] Inventor: Robert Dean Larrabee, Princeton, N.J.

[73] Assignee: RCA Corporation, New York, N.Y.

[22] Filed: Mar. 8, 1973

[21] Appl. No.: 339,212

[52] U.S. Cl. .............. 338/22 R, 317/235 Q, 338/25

[51] Int. Cl. .............................................. H01c 7/04

[58] Field of Search .......... 338/22, 23, 25; 307/310; 317/235 Q

[56] References Cited

UNITED STATES PATENTS

| | | | |
|---|---|---|---|
| 3,715,288 | 2/1973 | Risgin | 317/235 Q X |
| 3,395,265 | 7/1968 | Weir | 307/310 X |
| 3,505,632 | 4/1970 | Matsuzaki et al. | 338/23 |
| 3,393,328 | 7/1968 | Meadows et al. | 317/236 Q X |
| 3,017,520 | 1/1962 | Maupin | 317/235 Q X |

*Primary Examiner*—C. L. Albritton
*Attorney, Agent, or Firm*—Glenn H. Bruestle; Donald S. Cohen

[57] ABSTRACT

A thermal detector includes a flat substrate of a semiconductor material having opposed surfaces and at least one opening extending through the substrate between the opposed surfaces. Electrical compositions are formed in the substrate at one of the opposed surfaces and provide a desired electrical circuit. A layer of an electrical insulating material having a thermal resistance to the flow of heat along the plane of the layer is on the one surface of the substrate and extends over the opening in the substrate. At least one body of a thermally sensitive material is on the layer and is positioned only over the opening in the substrate. The thermally sensitive body is electrically connected to the electrical components in the substrate.

7 Claims, 4 Drawing Figures

PATENTED APR 2 1974 3,801,949

THERMAL DETECTOR AND METHOD OF MAKING THE SAME

BACKGROUND OF THE INVENTION

The invention herein disclosed was made in the course of or under a contact or subcontract thereunder with the Department of the Air Force.

The present invention relates to a thermal detector device and the method of making the same. More particularly, the present invention relates to a thermal detector device including a thermal detector element integral with a detector microcircuit with the thermal detector element being thermally isolated from the microcircuit, and the method of making the assembly.

A thermal detector element is an element which is sensitive to temperature changes and which can provide an electrical output which can be used to measure changes of temperature of the element. One type of such a thermal element is a pyroelectric detector which generates voltages and/or current in response to changes in temperature. Another type of a thermal detector element is one whose passive electrical characteristics, such as its electrical resistance, changes when the element is subjected to a temperature change. An integrated microcircuit is a body of a semiconductor material having various electrical components, such as transistors, diodes, resistors, capacitors and the like, formed therein or thereon and electrically connected in a desired circuit. Such microcircuits can be made very small in size. To make such a device as an infrared sensitive solid-state imaging device which is small in size, it would be desirable to combine many thermal detector elements with an integrated microcircuit. However, the combining of thermal detector elements with an integrated microcircuit raises the problem of interfacing the detector elements and the microcircuit. One of the more serious problems arises because thermal detector elements must be heated or allowed to cool by the radiation to be detected. Therefore, the detectors, for optimum performance, must be thermally isolated from their ambient surroundings. This precludes simply depositing or otherwise mounting the detectors directly on the microcircuit because the semiconductor material of the microcircuit is generally a good thermal conductor. Thus, the detectors would become so thermally loaded that it would adversely affect their performance as thermal detectors.

SUMMARY OF THE INVENTION

A thermal detector device includes a flat substrate having a pair of opposed surfaces and an opening extending therethrough between the opposed surfaces. A layer of a material having a thermal resistance to the flow of heat along the plane of the layer is on one of the opposed surfaces and extends over the opening. A body of a thermally sensitive material is on the layer and is positioned only over the opening in the substrate. The device is made by coating one of the opposed surfaces of the substrate with the layer of the thermally resistant material. The opening is then formed through the substrate from the other of the opposed surfaces leaving the layer of the thermally resistant material extending over the opening. The body of the thermally sensitive material is then mounted on the layer directly over the opening.

DETAILED DESCRIPTION

Figure 1:
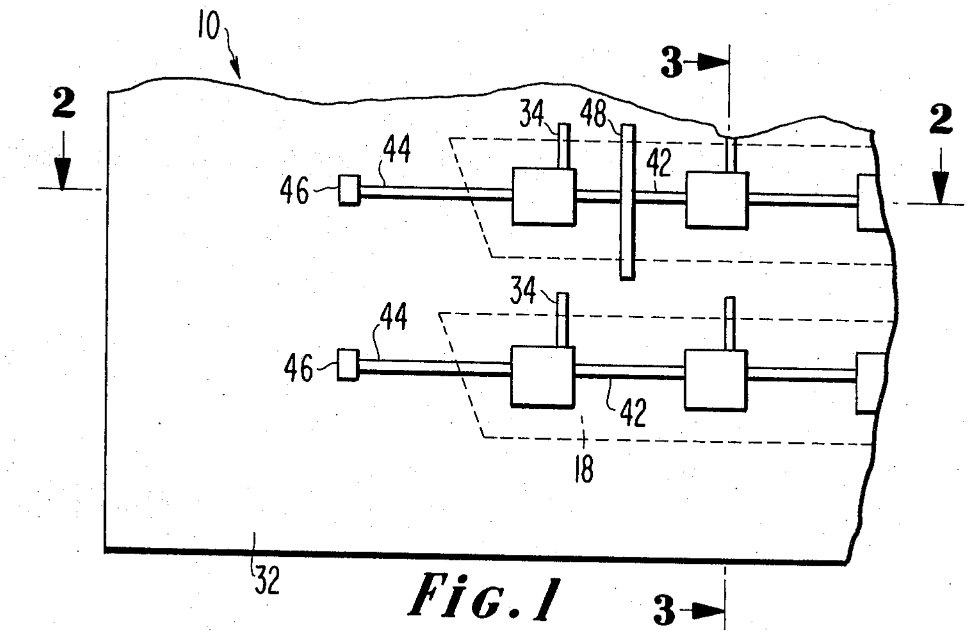
FIG. 1 is a top plan view of a form of a thermal imaging device incorporating the present invention.
Figure 2:
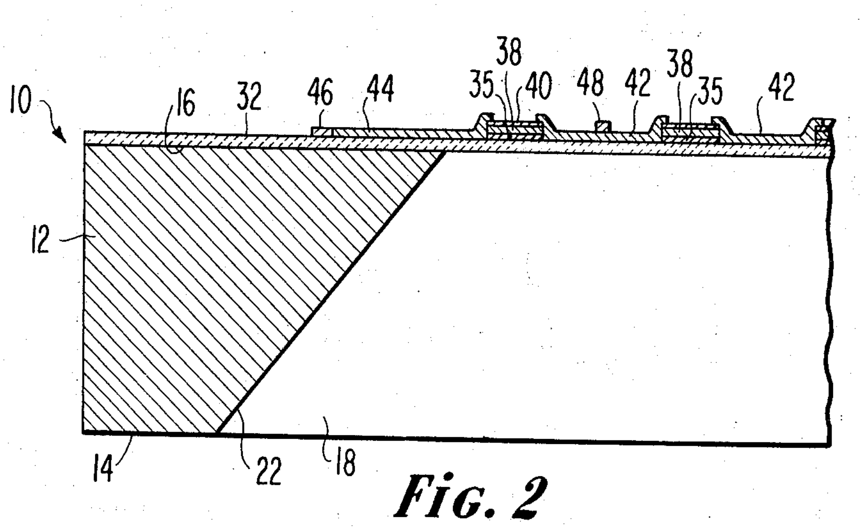
FIG. 2 is a sectional view taken along line 2—2 of FIG. 1.
Figure 3:
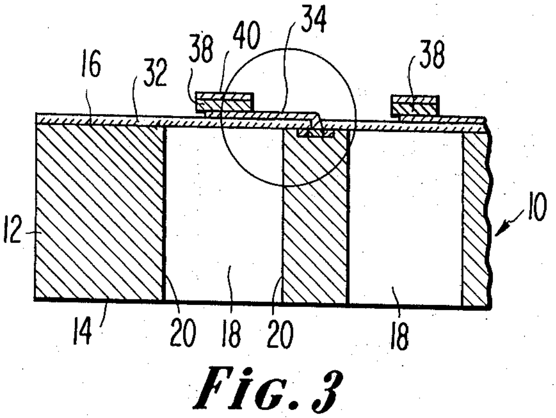
FIG. 3 is a sectional view taken along line 3—3 of FIG. 1.
Figure 4:
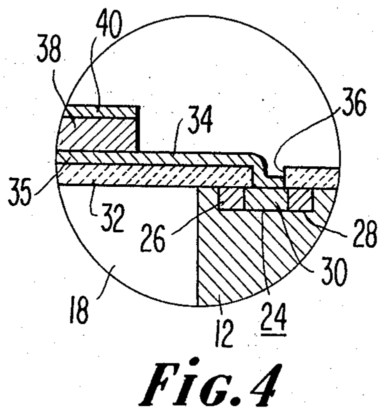
FIG. 4 is an enlarged view of the encircled portion of FIG. 3.

Referring to the drawings, a form of the thermal detector device of the present invention is generally designated as 10. The thermal detector device 10 comprises a flat substrate 12 of a semiconductor material, such as single crystalline silicon, having opposed surfaces 14 and 16. The substrate 12 has a plurality of openings 18 therethrough extending between the opposed surfaces 14 and 16. As shown the openings 18 are spaced, parallel, elongated slots having straight side surfaces 20 and tapered end surfaces 22. However, the openings 18 may be of other shapes and configurations. The substrate 12 has in and/or on the surface 16 various electrical components such as transistors, diodes, resistors, capacitors and the like, which are electrically connected in a desired circuit. As shown in FIGS. 3 and 4, an example of such an electrical component is a field-effect transistor 24 having spaced source and drain regions 26 and 28 with a gate channel region 30 therebetween.

A layer 32 of an electrical insulating material, such as silicon dioxide, silicon nitride, or silicon oxynitride, is on the surface 16 of the substrate 12 and extends over the openings 18. The insulating layer 32 is sufficiently thin to offer a high thermal resistance to the flow of heat along the plane of the insulating layer, but is thick enough to be self-supporting over the openings 18. An insulating layer 32 of silicon dioxide as thin as 12,000 Angstroms in thickness has been found to be sufficiently self-supporting over openings 18, 10 mils in width, and has appreciable thermal resistance. A plurality of metal film connecting strips 34 are on the insulating layer 32. Each of the connecting strips 34 extends from a metal film pad 35 which is on the insulating layer 32 over an opening 18 to an electrical component in the substrate 12. As shown in FIGS. 3 and 4, each of the connecting strips 34 extends through an opening 36 in the insulating layer 32 to contact circuitry in the substrate (e.g., the gate of the field effect transistor 24). A plurality of thermal detector elements 38 are on the insulating layer 32 over the opening 18 in the substrate 12 with each element 38 being seated on a metal film pad 35. Each of the thermal detector elements 38 may be a body of a pyroelectric material, such as, triglycine sulfate, triglycine fluoberyllate, strontium barium niobate, lead zirconate titanate, or polyvinylidene fluoride, a body of a thermistor material, a body of any other well known thermally sensitive material or a thermocouple junction. Each of the thermal detector elements 38 in the present embodiment is of a size so that the element is only over the opening 18 in the substrate 12 but is larger than the metal film pad on which the element is seated. Each of the thermal detector elements is coated with a metal contact film 40. Metal film connecting strips 42 extend between the thermal detector elements 38 and engage the contact film 40 on the detector elements. Thus, the thermal detector elements 38 in each row over an opening 18 are electrically connected together by the connecting strips 42, and each of the thermal detector elements 38 is individually electrically connected to the circuit in the substrate 12 by a connecting strip 34. A metal film connecting strip 44 extends from the contact film 40 on the thermal detector element 38 at the end of each row to a metal film termination pad 46 on the substrate 12 or to suitable addressing or read-out circuitry in the substrate 12. A metal film thermal conductivity strip 48 crosses either under or over one of the connecting strips 42 and extends to the substrate 12 at each side of the opening 18. The thermal conductivity strip 48 may be an electrical connection between two components of the circuit in the substrate 12. If so, a thin layer of an electrical insulating material, such as silicon dioxide, is provided between the thermal conductivity strip 48 and the connecting strip 42 where the two strips cross each other. Additional thermal conductivity strips may be provided across each of the conductivity strips 42.

Thus, the pyroelectric detector device 10 provides an array of thermal detector elements 38 integral with a microcircuit formed in the substrate 12. The thermal detector elements 38 are electrically connected to the microcircuit to feed the electrical output from the thermal detector elements to the microcircuit so that the output of the microcircuit provides an indication of the radiation detected by the detector elements. Since each of the thermal detector elements 38 is not directly over the substrate 12 but is only over an opening 18 in the substrate 12, the heat from the thermal detector elements can only reach the substrate along the plane of the insulating layer 32. However, since the insulating layer 32 has a high thermal resistance to the flow of heat in the plane of the insulating layer, only a small amount of heat will be lost from the detector elements 38 through the insulating layer 32 along the plane of the insulating layer to the substrate 12. Thus, the flow of heat from the thermal detector elements 38 to the substrate 12 is minimized so that a maximum amount of the heat is retained in the thermal detector elements 38 to maintain a high sensitivity of the thermal detector elements. Since the connecting strips 34 are thin, narrow strips, they will not conduct very much heat from the thermal detector elements 38 to the substrate 12. Since different ones of the thermal detector elements 38 may be detecting different radiation levels, it is undesirable to have a flow of heat between adjacent detector elements. Since the connecting strips 42 are thin and narrow, little heat will pass therethrough between the detector elements 38. However, the thermal conductivity strip 48 will insure that little heat will pass through the connecting strips 42 from one of the detector elements 38 to the next. Since the thermal conductivity strip 48 extends to the substrate 12, which is a good absorber of heat, any heat passing along the connecting strip 42 or through the underlying insulating layer 32 from one of the detector elements 38 will be by-passed along the thermal conductivity strip 48 to the substrate 12 rather than pass on to the next detector element. Thus, there is provided a pyroelectric detector device in which the thermal detector elements are integrated with a microcircuit but which minimizes the flow of heat from the thermal detector element to the microcircuit and the flow of heat between adjacent detector elements.

To make the pyroelectric detector device 10, a flat substrate 12 of the semiconductor material without the openings 18 therethrough is first provided with the desired microcircuit in and/or on the surface 16 thereof. The various electrical components of the microcircuit are formed by techniques well known in the art, such as by diffusion, ion-implantation, oxidation, metallization and the like. During the formation of the microcircuit, the insulating layer 32 is formed on the surface 16 of the substrate 12. This can be achieved by either thermally growing the insulating layer on the surface of the substrate or by epitaxially depositing the layer from a gas containing the elements of the material of the layer. Also, during the formation of the microcircuit, the openings 36, connecting strips 34, metal film pads 35, termination pads 46 and thermal conductivity strips 48 are formed. The various metal areas may be deposited by the well-known technique of evaporation in a vacuum through a suitable mask. Alternatively, they may be formed by depositing a metal film over the entire surface of the insulating layer 32, coating a masking layer of a resist material on the areas of the metal film which are to remain, using standard photolithographic techniques, and removing the uncovered portions of the metal film with a suitable etchant.

The surface 14 of the substrate 12 is then coated with one or more masking layers of materials which will not be attacked by an etchant for the semiconductor material of the substrate 12, such as a resist, oxide, nitride or a metal layer. The masking layer is provided with openings where openings 18 are to be formed in the substrate 12. The openings 18 are then formed through the substrate 12 with a suitable etchant. The openings 18 can be provided with the straight side walls 20 by using a substrate 12 which has the surfaces 14 and 16 oriented along the (110) crystallographic plane, and etching the openings 18 along the (111) crystallographic planes of the substrate which are perpendicular to the surfaces 14 and 16 as described in U. S. Pat. No. 3,579,057 to A. I. Stoller, issued May 18, 1971, entitled "Method of Making a Semiconductor Article and the Article Produced Thereby."

The thermal detector elements 38 are then provided on the metal film pads 35. The thermal detector elements 38 may be preformed bodies of the thermally sensitive material which are placed on and bonded to the metal film pads 35. Alternatively, the thermal detector elements 38 may be formed by suitably depositing a layer of the thermally sensitive material over the entire surface of the insulating layer 32, forming a masking layer of a resist material over the areas of the thermally sensitive layer where the thermal detector elements are to be provided using standard photolithographic techniques, and removing the uncovered portion of the thermally sensitive layer with a suitable etchant. The contact films 40, and connecting strips 42 and 44, are then formed on the thermal detector 10 using the same technique as used to form the connecting strips 34.

I claim:

1. A thermal detector device comprising a flat substrate having opposed surfaces and an opening in one of said surfaces, a layer of a material having a thermal resistance to the flow of heat along the plane of the layer on said one surface of the substrate and extending over said opening, and a body of a thermally sensitive material on said layer and positioned only over said opening in said substrate with the periphery of the body being spaced from the periphery of the opening.

2. A thermal detector in accordance with claim 1 in which the opening extends through said substrate from said one surface to the other surface.

3. A thermal detector in accordance with claim 2 in which the substrate is of a single crystalline semiconductor material and the layer is of an electrical insulating material.

4. A thermal detector in accordance with claim 3 including at least one electrical component formed in the substrate at the one surface and means electrically connecting said body to the component.

5. A thermal detector in accordance with claim 4 in which the means electrically connecting the body to the component comprises a metal film connecting strip on the insulating layer and extending between the body and the component.

6. A thermal detector in accordance with claim 5 including a plurality of bodies of the thermally sensitive material on said layer with each of said bodies being only over an opening in the substrate, a plurality of electrical components in the substrate at said one surface, and a separate metal film connecting strip electrically connecting each of the bodies to a separate one of the components.

7. A thermal detector in accordance with claim 6 including a metal film interconnecting strip on said insulating layer and electrically connecting at least two of said bodies.

* * * * *